(12) United States Patent
Okano et al.

(10) Patent No.: US 9,064,506 B2
(45) Date of Patent: Jun. 23, 2015

(54) WRITABLE INFORMATION RECORDING AND REPRODUCING APPARATUS

(75) Inventors: Hideaki Okano, Yokohama (JP); Kazuo Watabe, Yokohama (JP); Chikara Tanioka, Yokohama (JP); Akihito Ogawa, Fujisawa (JP); Takashi Usui, Saitama (JP); Kazuaki Doi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/618,173

(22) Filed: Sep. 14, 2012

(65) Prior Publication Data

US 2013/0021892 A1   Jan. 24, 2013

Related U.S. Application Data

(63) Continuation of application No. PCT/JP2010/070921, filed on Nov. 24, 2010.

(51) Int. Cl.
  *G11B 7/09* (2006.01)
  *G11B 7/095* (2006.01)
  *G11B 7/00* (2006.01)

(52) U.S. Cl.
  CPC ............ *G11B 7/0956* (2013.01); *G11B 7/0901* (2013.01); *G11B 7/0938* (2013.01); *G11B 2007/0013* (2013.01)

(58) Field of Classification Search
  CPC .. G11B 7/0901; G11B 7/0903; G11B 7/0938; G11B 7/094; G11B 7/0945; G11B 7/095–7/0956; G11B 2007/0003; G11B 2007/0009; G11B 2007/0013; G11B 2220/23–2220/235; G11B 2220/2541; G11B 2220/2579; G11B 2220/2583

USPC ......... 369/44.26, 44.32, 44.33, 44.37, 44.38, 369/47.38–47.48, 53.2–53.24, 94, 95, 369/112.23–112.26
  See application file for complete search history.

(56) References Cited

U.S. PATENT DOCUMENTS 5,172,356 A * 12/1992 Kibune .................... 369/44.14
2002/0191501 A1   12/2002 Ueno
(Continued)

FOREIGN PATENT DOCUMENTS

JP    2002-117585 A    4/2002
JP    2003-36537 A     2/2003
(Continued)

OTHER PUBLICATIONS

International Search Report mailed on Feb. 8, 2011, issued for International Application No. PCT/JP2010/070921, filed on Nov. 24, 2010 (with English translation).
(Continued)

*Primary Examiner* — Nathan Danielsen
(74) *Attorney, Agent, or Firm* — Oblon, McClelland, Maier & Neustadt, L.L.P.

(57) ABSTRACT

According to one embodiment, an information recording and reproducing apparatus including, a focus control module, an objective lens control module, a calculation module, and a tracking control module. If, detection the recording marks line, to focus a laser light of a second wavelength to the recording layer through an objective lens and to operation a recording layer tracking control using a tracking error signal taken out from a second reflected light and a laser light of a first wavelength to a track groove through the objective lens and to operation a guide layer tracking control to control the objective lens using a tracking error signal taken out from a first reflected light.

15 Claims, 9 Drawing Sheets

(56) References Cited

U.S. PATENT DOCUMENTS

| | | | |
|---|---|---|---|
| 2005/0243688 A1* | 11/2005 | Schleipen | 369/125 |
| 2008/0316902 A1* | 12/2008 | Saito et al. | 369/112.23 |
| 2011/0188358 A1* | 8/2011 | Takahashi et al. | 369/44.26 |

FOREIGN PATENT DOCUMENTS

| | | | |
|---|---|---|---|
| JP | 2008-97754 A | | 4/2008 |
| JP | 2010-40093 A | | 2/2010 |
| WO | WO 2010038311 A1 | * | 4/2010 |

OTHER PUBLICATIONS

International Written Opinion mailed on Feb. 8, 2011, issued for International Application No. PCT/JP2010/070921, filed on Nov. 24, 2010.

* cited by examiner

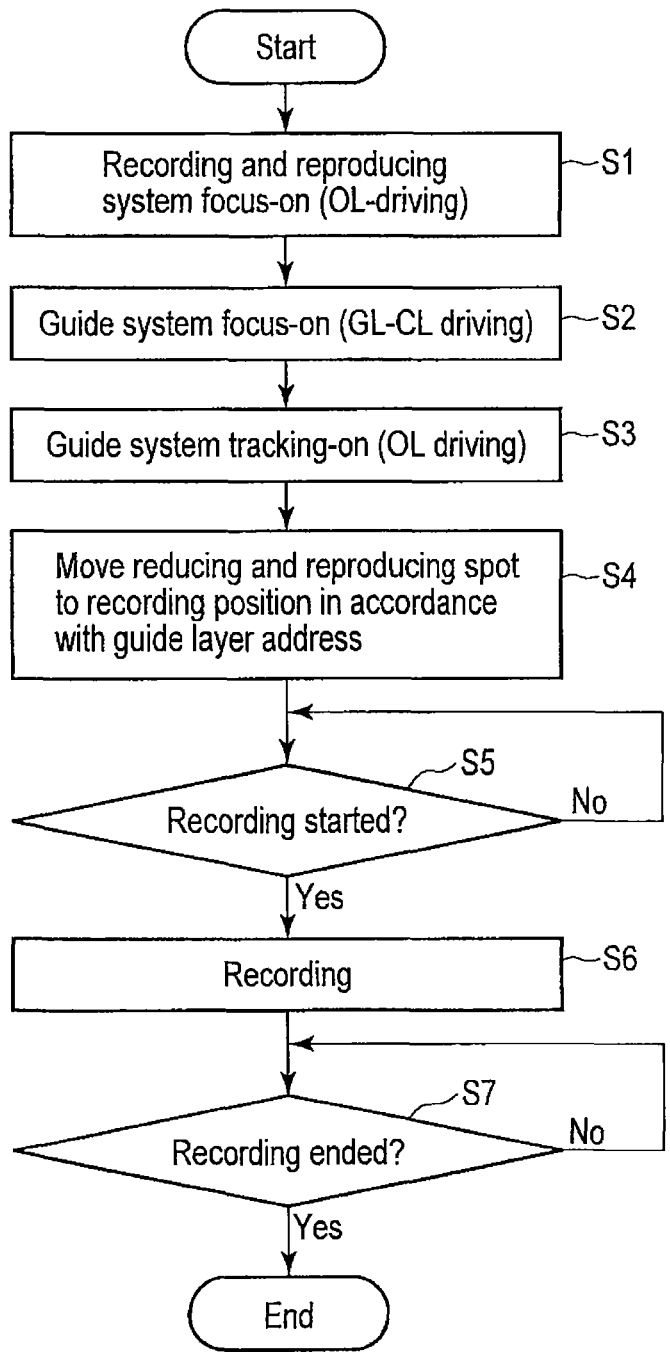
F I G. 3

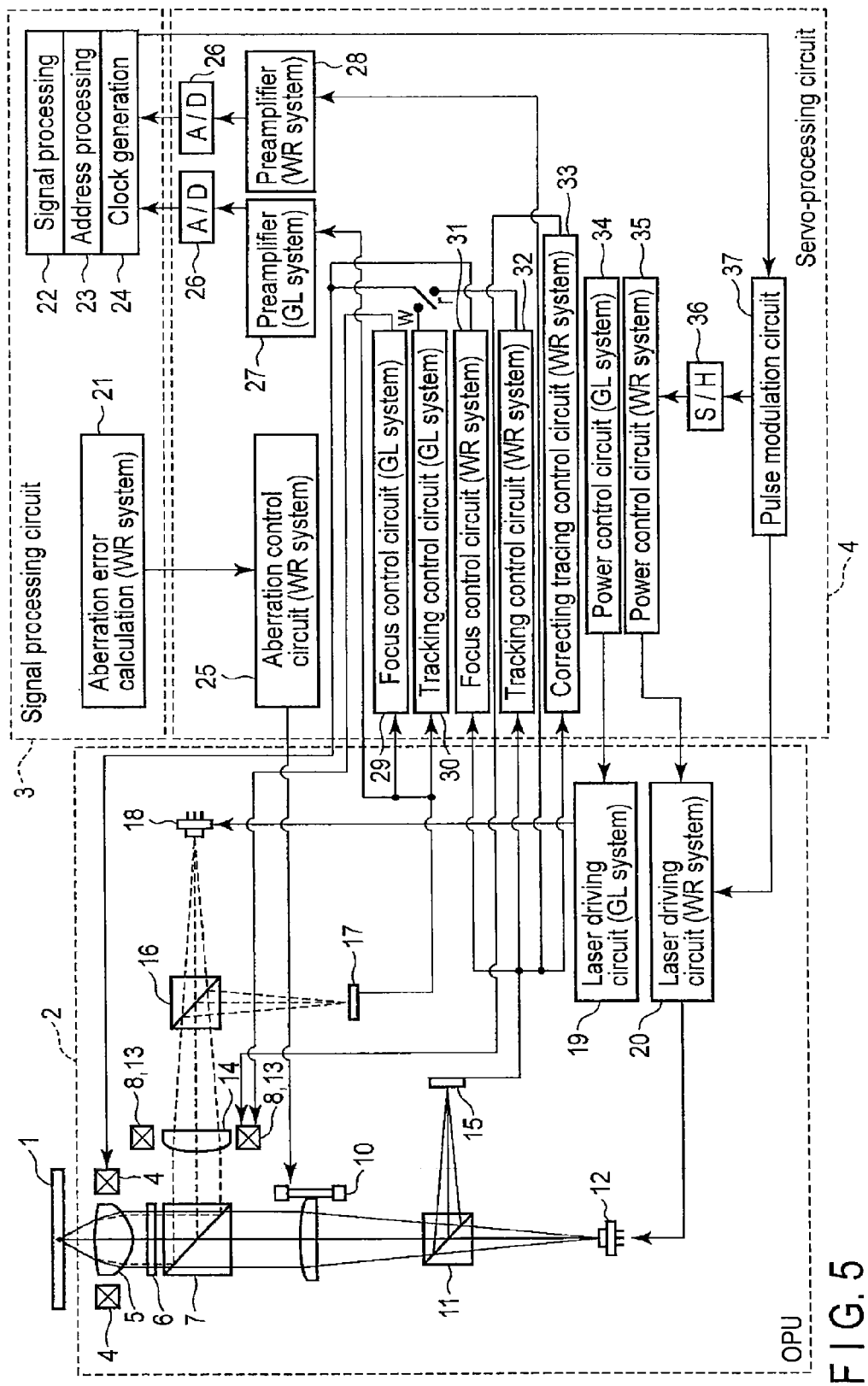
F I G. 5

WRITABLE INFORMATION RECORDING AND REPRODUCING APPARATUS

CROSS REFERENCE TO RELATED APPLICATIONS

This application is a Continuation Application of PCT Application No. PCT/JP2010/070921, filed Nov. 24, 2010, the entire contents of which are incorporated herein by reference.

FIELD

Embodiments described herein relate generally to an information recording and reproducing apparatus.

BACKGROUND

For recording media represented by CD (Compact Disc), Digital Versatile Disc (DVD), BD (Blu-ray Disc), and the like, increased recording density has been mostly dealt with to short the wavelength of laser light and increasing the NA (numerical aperture) of an objective lens. However, both of these measures are said to approach the limits for technical reasons or the like.

Various proposals have been made to break down this situation; every effort has been made to develop a method for forming a recording layer of multiple layers in order to increase the recording density. This method is an extension of the current optical disc technique and is considered to be very practical. However, there are growing concerns about a decrease in productivity associated with multilayered optical discs. A reason for the concerns is that tracking grooves containing address information need to be formed for each layer. The need for a molding operation for each layer increases processing time or reduces manufacturing yield.

In connection with this, a multilayered optical disc based on what is called a guide layer (GL system) is known which includes one guide layer and a plurality of information recording layers so that grooves for tracking are provided only in the guide layer. The optical disc with the guide layer different from the information recording layers is advantageous in that molding processing needs to be carried out only on the guide layer, preventing an increase in the number of molding processing operations in spite of an increased number of information recording layers resulting from a higher capacity.

For optical discs based on the GL system, recording is carried out as follows. First, light with a DVD wavelength is concentrated on the guide layer using an objective lens in order to perform tracking based on guide grooves provided in the guide layer. Then, recording is carried out by using the same objective lens to concentrate light with a BD wavelength for recording on the recording layer. The GL system is characterized in that the guide layer is responsible for the tracking operation for recording.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a flowchart showing a recording operation performed on a recording medium with no recorded information according to the embodiment;

FIG. 5 is a block diagram of an information recording and reproducing apparatus according to Embodiment 2 according to the embodiment;

DETAILED DESCRIPTION

Various embodiments will be described hereinafter with reference to the accompanying drawings. In general, according to one embodiment, an information recording and reproducing apparatus configured to record and reproduce information in and from an optical disc comprising a guide layer with address information along a track groove and a recording layer with a sequence of recording marks in recording completed areas, the information recording and reproducing apparatus comprising: a focus control module configured to concentrate laser light with a first wavelength on the track groove through an objective lens and performing focus control using a focus error signal obtained from first reflected light from the track groove; an objective lens control module configured to perform guide layer tracking control by controlling the objective lens in accordance with a tracking error signal obtained from the first reflected light, and performing focus control by concentrating laser light with a second wavelength on the recording layer through the objective lens and controlling the objective lens using a focus error signal obtained from the second reflected light; a calculation module configured to calculate an amount of relative misalignment between the guide layer and the recording layer if the sequence of recording marks is detected, by performing recording layer tracking control using a tracking error signal obtained from the second reflected light concurrently with the guide layer tracking control; and a tracking control module configured to perform the recording layer tracking control while making correction based on the amount of relative misalignment when additional recording is carried out.

Embodiments will now be described hereinafter in detail with reference to the accompanying drawings.

Embodiment 1

Figure 1:
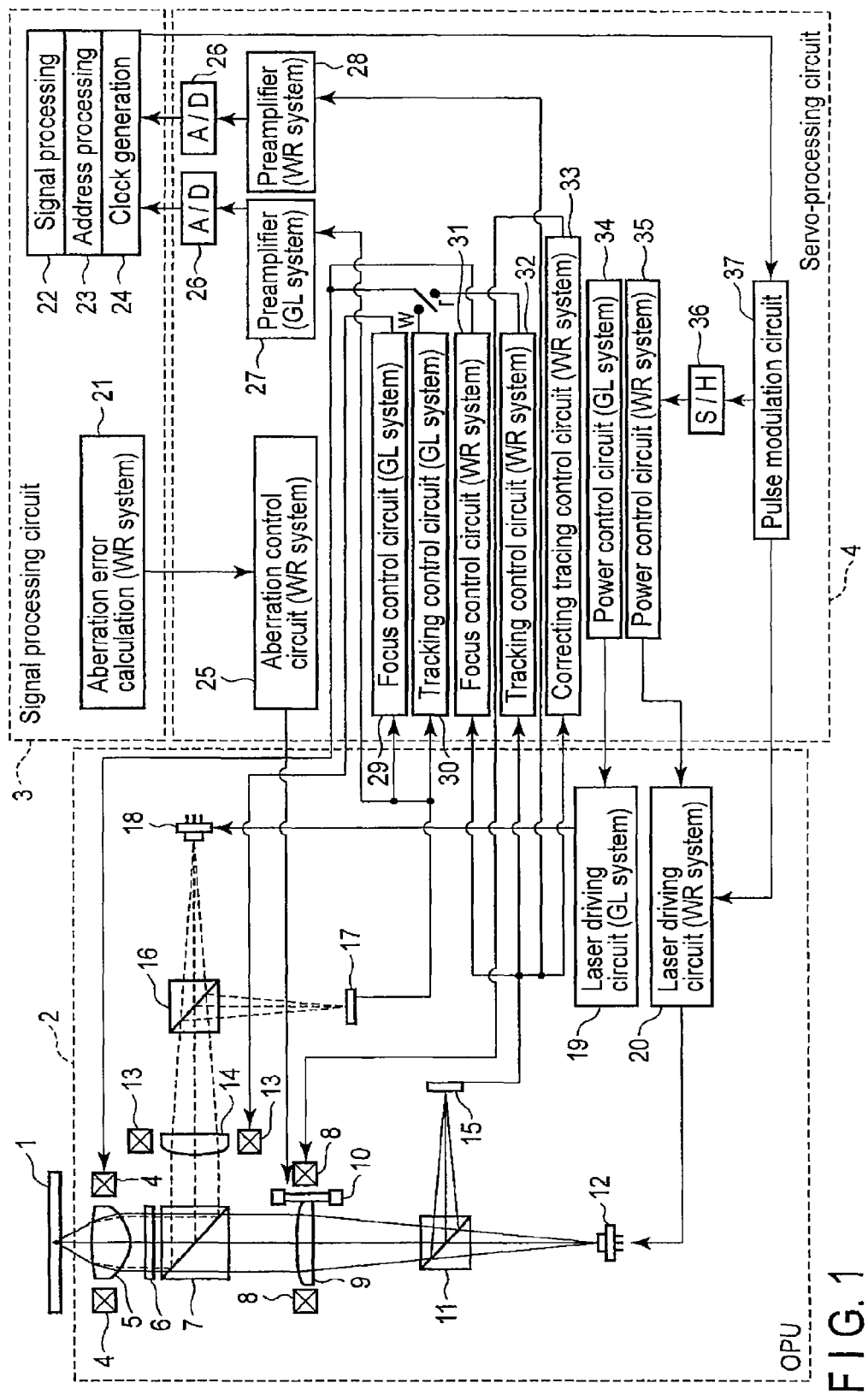
FIG. 1 is a block diagram of an information recording and reproducing apparatus according to Embodiment 1 according to an embodiment.

FIG. 1 is a block diagram of an information recording and reproducing apparatus according to Embodiment 1. The present apparatus is configured to record information in a recording medium 1 or to reproduce information from the recording medium 1. The apparatus comprises an optical pickup unit (OPU) 2, a signal processing circuit 3, and a servo-processing circuit 4.

OPU 2 comprises a light source that emits laser light for recording and reproduction and laser light for guidance to the recording medium 1, a light receiving element that receives reflected light from the recording medium 1, and an optical system coupled to the light source and the light receiving medium. Specifically, OPU 2 comprises an objective lens driving mechanism 4, an objective lens (OL) 5, a quarter-wave plate 6, and a dichroic prism 7.

Furthermore, for a recording and reproducing system, OPU 2 comprises a correcting tracking control mechanism 8, a collimator lens (WR system) 9, an aberration correction mechanism 10, a polarization beam splitter (PBS) 11, a recording and reproducing system light source 12, and a recording and reproducing system light receiving element 15. Additionally, for a guide system, OPU 2 comprises a focus control mechanism 13, a collimator lens (GL system) 14, a polarization beam splitter (PBS) 16, a guide system light receiving element 17, and a guide system light source 18.

The recording and reproducing light source 12 is connected to a laser driving circuit (WR system) 20. The guide light source 18 is connected to a laser driving circuit (GL system) 19.

The laser driving circuit (GL system) 19 and the laser driving circuit (WR system) 20 are subjected to driving control by the signal processing circuit 3.

OPU 2 is connected to an OPU driving mechanism (not shown in the drawings) and can be moved in a radial direction of the recording medium 1 by the OPU driving mechanism.

The signal processing circuit 3 carries out various calculations and signal processing such as an aberration error calculation (WR) 21, signal processing 22, address processing 23, and clock generation.

The servo-processing circuit 4 comprises an aberration control circuit 25 and controls the aberration correction mechanism 10 in accordance with the result of the aberration error calculation (WR) 21. Furthermore, the servo-processing circuit 4 comprises an analog-to-digital converter 26, a preamplifier (GL system) 27, and a preamplifier (WR system) 28. The servo-processing circuit 4 amplifies and converts signals generated by the guide system light receiving element 17 and the recording and reproducing system light receiving element 15 into digital signals, and outputs the digital signals to the signal processing circuit 3.

Furthermore, the servo-processing circuit 4 comprises a focus control circuit (GL system) 29, a tracking control circuit (GL system) 30, a focus control circuit (WR system) 31, and a tracking control circuit (WR system) 32 as circuits for achieving focus control and tracking control for each of the guide system and the recording and reproducing system.

The focus control circuit (GL system) 29 controls the focus control mechanism 13 based on a signal generated by the guide system light receiving element 17. The tracking control circuit (GL system) 30 controls the objective lens driving mechanism 4 based on a signal generated by the guide system light receiving element 17.

Additionally, the focus control circuit (WR system) 31 controls the objective lens driving mechanism 4 based on a signal generated by the recording and reproducing system light receiving element 15. The tracking control circuit (WR system) 32 controls the objective lens driving mechanism 4 based on a signal generated by the recording and reproducing system light receiving element 15. In particular, according to the present embodiment, the servo-processing circuit 4 comprises a correcting tracking control 33 that controls the correcting tracking control mechanism 8 based on a signal generated by the recording and reproducing system light receiving element 15.

The servo-processing circuit 4 further comprises a power control circuit (GL system) 34 that controls the laser driving circuit (GL system) 19 and a power control circuit (WR system) 35 that controls the laser driving circuit (WR system) 20. The power control circuit (WR system) 35 is controlled by a pulse modulation circuit 37 via a sample-and-hold circuit 36. The pulse modulation circuit 37 is controlled by the signal processing circuit 3 to control the laser driving circuit (WR system) 20.

The signal processing circuit 3 and the servo-processing circuit 4 are connected to a controller (not shown in the drawings), and the controller controls the signal processing circuit 3 and the servo-processing circuit 4 based on instructions from a higher system. Moreover, the information recording and reproducing apparatus comprises a disc driving mechanism (not shown in the drawings) to rotationally drive the recoding medium 1 for recording and reproduction of information.

Figure 2:
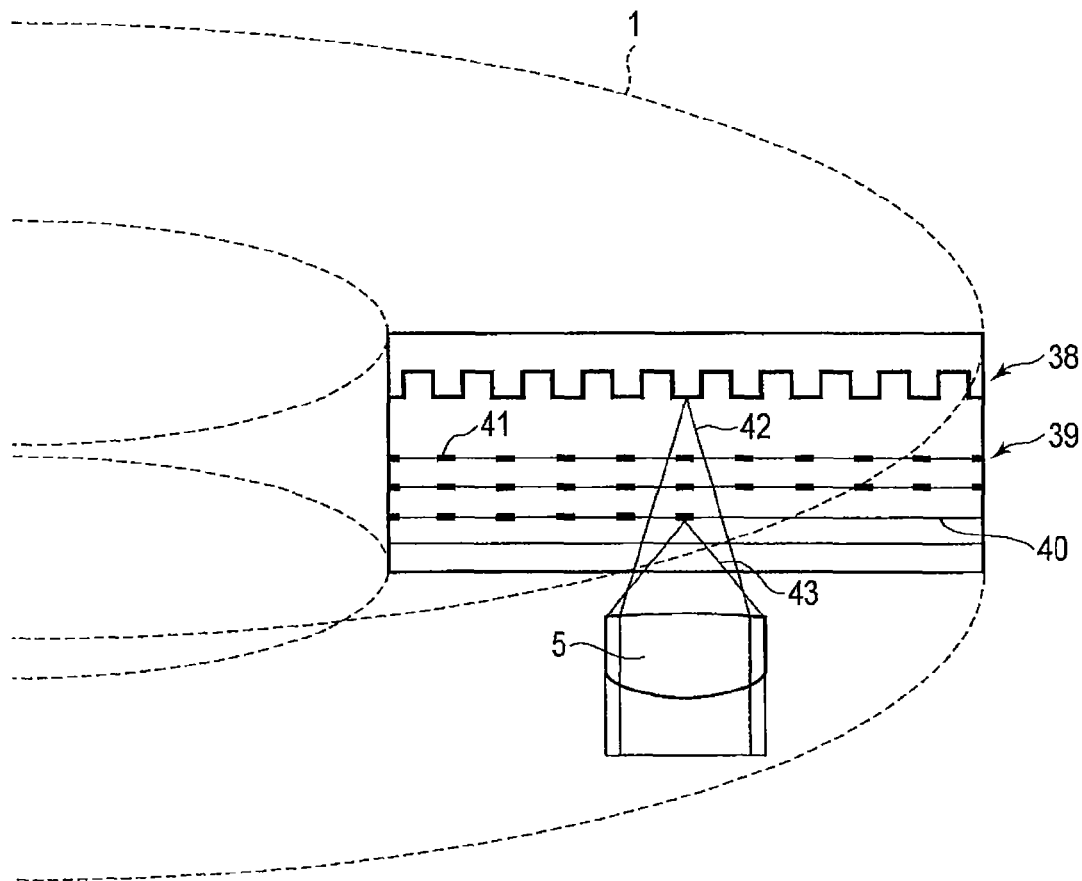
FIG. 2 is a diagram showing a layer structure in a recording medium according to the embodiment.

FIG. 2 shows a layer structure in the recording medium. FIG. 2 schematically shows a cross section of the recording medium. The recording medium 1 comprises a guide layer 38 and a recording layer 39. When information is recorded or reproduced in or from the recording medium 1, the guide layer 38 is positioned farther from the objective lens 5, and the recording layer 39 is positioned closer to the objective lens 5. The recording layer 39 has a multilayer structure that enables information to be recorded in a plurality of layers. As shown in FIG. 2, recording marks 41 are recorded in information recorded areas in which information has already been recorded. Areas in which the recording mark 41 is not recorded are unused areas 41.

As shown in FIG. 2, guide light 42 from the objective lens 5 concentrates on the guide layer 38 in the recording medium 1. Recording light 43 from the objective lens 5 concentrates on the recording layer 39 in the recording medium 1. Reflected light from each of the layers enters the objective lens 5 and is then processed.

The following operations will be described: a recoding operation performed on a recording medium with recorded information, a reproduction operation performed on a recording medium with no recorded information, and an additional recording operation performed on a recording medium with recorded information.

First, a recording operation performed on the recording medium 1 with no recorded information will be described. FIG. 3 shows a flowchart focusing on a servo-operation.

(Recording Operation Performed on a Recording Medium for no Recorded Information)

The recording and reproducing light source 12 is, for example, a laser diode (blue LD) with a wavelength of about 405 nm. Part of blue laser light (recording light 43) emitted by the blue LD and having a reproduction intensity is monitored by a front monitor photodetector (PD). According to the result of the monitoring, the recording and reproducing power control circuit (WR system) 35 controls the emission intensity of the blue LD. The blue laser light passes through the polarization beam splitter (PBS) 11 and is collimated into substantially parallel light beams by the collimator lens (WR system) 9.

The collimator lens 9 can be driven in the direction of an optical axis and in a direction perpendicular to the optical axis (radial direction). The aberration correction mechanism 10 drives the collimator lens 9 in the direction of the optical axis to allow spherical aberration to be corrected according to the depth from the surface of the recording layer 39. Furthermore, the correcting tracking control mechanism 8 drives the collimator lens 9 in the radial direction to allow the blue LD to carry out tracking during additional recording. The correcting tracking control is not performed during a recording operation on the recording medium 1 with no recorded information.

The substantially parallel light beams into which the blue laser light has been collimated pass through the dichroic prism 7 and the quarter-wave wavelength plate 6 and are converted into circularly-polarized light, which then enters the objective lens (OL) 5.

The objective lens 5 can be driven in the direction of the optical axis. The objective lens driving mechanism 4 drives the objective lens 5 in the direction of the optical axis to allow the focus of recording light or reflected light (reproduction light) to be adjusted. The objective lens concentrates the light on the vicinity of the recording layer 39, and the light reflected by the recording layer 39 enters the objective lens 5 again. This incident light is collimated into substantially parallel light beams, which are then converted by the quarter-wave plate into linearly-polarized light with a polarization direction different, by 90 degrees, from the polarization direction before the reflection.

The light passes through the dichroic prism 7 and the collimator lens (WR system) 9 and is then reflected by PBS 11. The reflected light then enters the recording and reproducing system light receiving element 15, which generates a focus error signal. The focus control circuit (WR system) 31 controls the objective lens driving mechanism 4 in accordance with the focus error signal. Thus, the position of the objective lens 5 is controlled along the direction of the optical axis so that the light from the objective lens 5 is subjected to focus adjustment to concentrate at a desired position on the recording layer 39 ("recording and reproducing system focus-on [OL driving]": FIG. 3 [S1]).

The guide system light source 18 is, for example, a laser diode (red LD) with a wavelength of about 660 nm. Part of red laser light (guide light 42) emitted by the red LD is monitored by the front monitor PD. According to the result of the monitoring, the power control circuit (GL system) 34 controls the emission intensity of the red LD. The red laser light passes through PBS 16 and is collimated into substantially parallel light beams by the collimator lens (GL system) 14. The collimator lens 14 can be driven in the direction of the optical axis. The focus control mechanism 13 drives the collimator lens 14 to allow the focus of the guide light to be adjusted.

The guide light from the collimator lens 14 is reflected by the dichroic prism 7. The reflected light then pass through the quarter-wave plate 6 and is thus converted into circularly-polarized light, which then enters the objective lens (OL) 5. The light from the objective lens 5 concentrates on the vicinity of the guide layer 38. Thus, the light reflected by the guide layer 38 enters the objective lens 5 again. The light is then converted by the quarter-wave plate 6 into linearly polarized light with a polarization direction different, by 90 degrees, from the polarization direction before the reflection. The light reflected by the dichroic prism 7 and the collimator lens (GL system) 14 and is then reflected by PBS 16. The reflected light enters the guide system light receiving element 18, which then generates a focus error signal.

The focus control circuit (GL system) 29 controls the focus control mechanism 13 in accordance with the focus error signal. Thus, the position of the collimator lens (GL system) 14 is controlled along the direction of the optical axis so that the red LD light is subjected to focus adjustment to concentrate on the guide layer 38 ("guide system focus-on [GL-CL driving]": FIG. 3 [S2]).

Furthermore, the guide system light receiving element 17 generates a tracking error signal. The tracking control system (GL system) 30 controls the objective lens driving mechanism 4 based on the tracking error signal ("guide system tracking-on [OL driving]": FIG. 3 [S3]).

Furthermore, based on a signal from the guide system light receiving element 17, a wobble signal, a prepit signal, or the like which is superimposed on the groove is obtained. The signal obtained is amplified by the preamplifier (GL system) 27, and the amplified signal is subjected to analog-to-digital conversion. The resultant signal is supplied to the signal processing circuit 3, which then carries out the address processing 23, the clock generation 24, or the like. In this state, the blue laser light concentrated on the recording layer 39 is controlled in the radial direction along a guide groove in the guide layer 38.

Then, in accordance with an address obtained from the guide layer 38, the recording and reproducing spot of the objective lens 5 is moved to a recording start position (FIG. 3 [S4]). Then, recording is carried out by setting the emission intensity of the blue LD to the value of a recording intensity and allowing the pulse modulation circuit 37 to provide pulse modulation (FIG. 3 [S5] to [S7]).

A recording operation performed on a recording medium with no record information involves no tracking operation using the collimator lens (WR system) 9, which remains fixed at a predetermined reference position.

(Reproduction Operation on a Recording Medium for Recorded Information)

Now, a reproduction operation will be described. During the reproduction operation, the guide system is not used but only the recording and reproducing system is operative. The same operation as the operation performed during recording is performed; the operation starts with the emission of blue laser light from the blue LD followed by the reflection of the light by the recording layer 39 in the recording medium 1 and ends with the reception of the light by the recording and reproducing system light receiving element 15. However, a tracking operation is performed in which the tracking control circuit (WR system) 32 drives the objective lens 5 based on a tracking error signal generated by the recording and reproducing system light receiving element 15 based on the recording marks. At this time, as is the case with the recording operation on the recording medium 1 with no recorded information, the collimator lens (WR system) 9 remains fixed at the predetermined reference position.

(Additional Recording Operation on a Recording Medium for Recorded Information)

Figure 4:
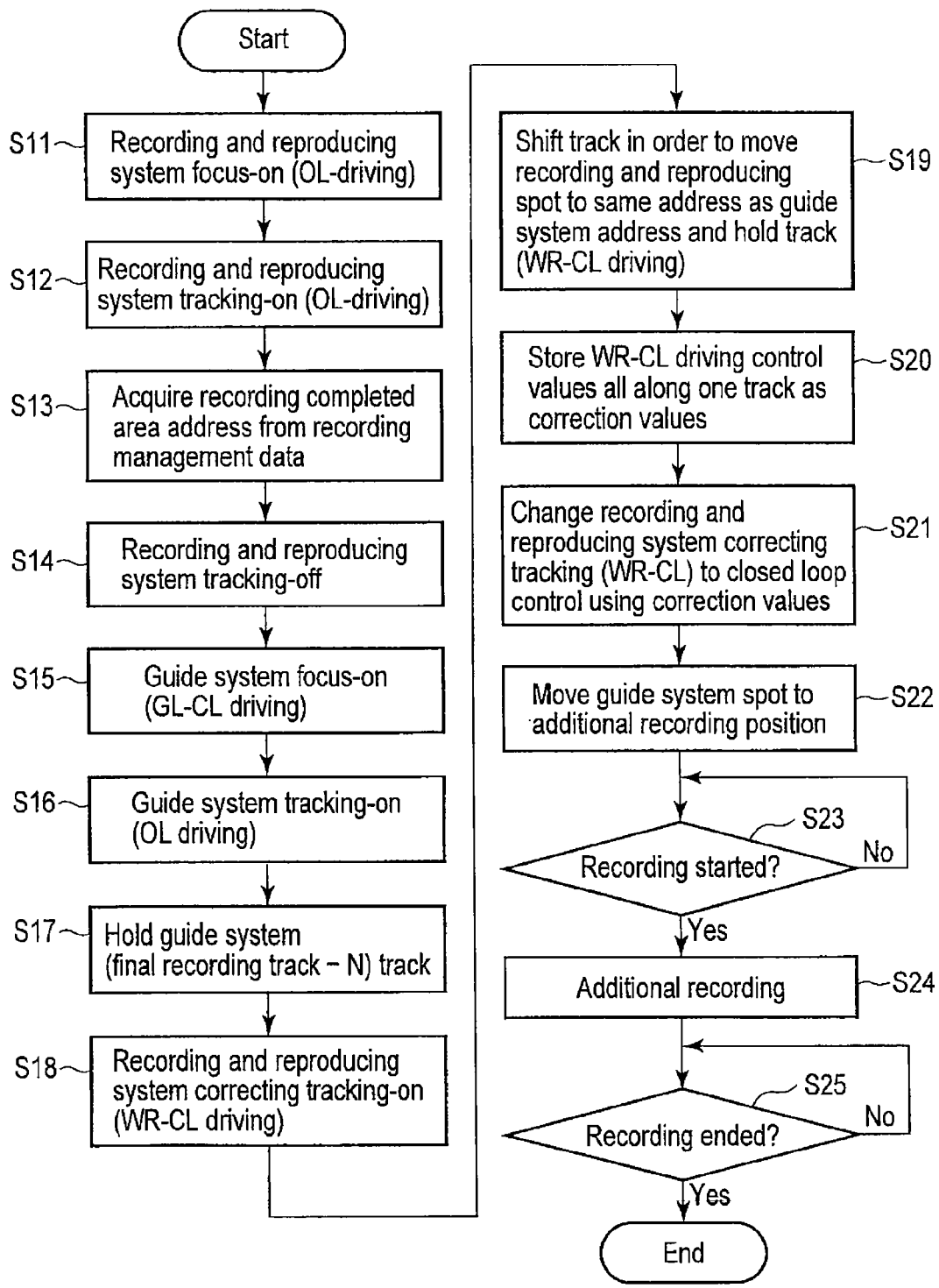
FIG. 4 is a flowchart showing an additional recording operation performed on a recording medium with recorded information according to the embodiment.

Now, an additional recording operation on the recording medium 1 in which information is recorded by a previous recording operation will be described. FIG. 4 shows a flowchart focusing on operations of the servo-processing system. First, a reproduction operation is performed on the recording medium 1 with recorded information in accordance with the above-described procedure for a reproduction operation on the recording medium with recorded information to acquire the address of the latest recording completed area (FIG. 4 [S11] to [S13]).

Then, a tracking operation performed in order to acquire the address by driving the objective lens 5 is canceled ("recording and reproducing system tracking-off": FIG. 4 [S14]). At this time, the recording and reproducing system continues a focus operation using the objective lens 5.

Then, focus control is performed by driving the collimator lens (GL system) 14 in the direction of the optical axis in accordance with a focus error signal from the guide system ("guide system focus-on [GL-CL driving]"; FIG. 4 [S15]). Furthermore, tracking control is performed by driving the objective lens 5 in accordance with a tracking error signal from the guide system ("guide system tracking-on [OL driving]"; FIG. 4 [S16]).

At this time, the address of the guide layer 38 can be read. Thus, a track position is shifted by a predetermined number of tracks N from the final track of the latest recording completed area acquired in (S11) to (S13) toward the recording completed side, and the resulting track is held (FIG. 4 [S17]). This track position is the (final track number)—N.

This track shifting is to shift the focal spot of the recording and reproducing system to the recording completed area of the recording layer 39. This allows the tracking error signal to be obtained from the recording and reproducing system. In accordance with the tracking error signal from the recording and reproducing system, the correcting tracking control mechanism 8 drives the collimator lens (WR system) 9 in the direction orthogonal to the optical axis to perform correcting tracking control ("recording and reproducing system correcting tracking-on [WR-CL driving]": FIG. 4 [S18]).

As described above, with the tracking operation performed simultaneously by the guide system and the recording and reproducing system, the track address of the track being tracked by the focal spot is read from each of the guide layer 38 and the recording layer 39. The collimator lens (WR system) 8 is used to shift the track so that the same track address is read from both layers. When the same track address is read from both layers, the corresponding track is held ("shifting the track for the same address and holding the track [WR-CL driving]": FIG. 4 [S19]).

At this time, the tracking by the objective lens 5 is controlled based on signals from the GL system. This operation is similar to the operation on the recording medium with recorded information. Without a change such as a tilt of the disc, the correcting tracking by the collimator lens (WR system) 9 should be immovable from the reference position. However, a change such as a tilt of the disc shifts the tracking from the reference position, and thus a correcting tracking operation is performed. A control value for this correcting tracking driving is a correction value for tracking correction carried out by the recording and reproducing system. The correction value is acquired all along one track at appropriate angular intervals and then held (FIG. 4 [S20]).

Then, such correcting tracking control by the recording and reproducing system is switched from closed loop control to open loop control using the correction values acquired (FIG. 4 [S21]).

The focal spot of the guide system is shifted to the track corresponding to an additional recording position based on the address already acquired (FIG. 4 [S22]), and additional recording is carried out (FIG. 4 [S23] to [S25]). Thus, the present embodiment learns the amount of relative misalignment of the position of tracking performed by the recording and reproducing system, and caries out the required correction. Therefore, for example, even though the tilt of the optical disc is changed, additional recording can be achieved without misalignment of the track with a sequence of recording completion marks or overwriting of recording completed areas.

Embodiment 2

FIG. 5 shows a block diagram of an information recording and reproducing apparatus according to Embodiment 2. Now, only aspects different from the aspects of Embodiment 1 described above will be described. Embodiment 1 described above is configured such that not only the guide system performs a tracking operation but also the recording and reproducing system performs correcting tracking. In contrast, Embodiment 2 is different from Embodiment 1 in that the guide system not only performs a tracking operation but also carries out correcting tracking instead of the guide system.

Thus, a comparison of the configuration according to Embodiment 1 in FIG. 1 with the configuration according to Embodiment 2 in FIG. 5 indicates that the correcting tracking control mechanism 8 for the collimator lens (WR system) 9 according to Embodiment 1 is, in Embodiment 2, provided for the collimator lens (GL system) 14 rather than for the collimator lens (WR system) 9.

(Additional Recording Operation on a Recording Medium for Recorded Information)

An additional recording operation performed on the recording medium 1 with recorded information according to Embodiment 2 will be described with reference to FIG. 6. First, as is the case with Embodiment 1, a reproduction operation is performed on the recording medium 1 with recorded information to acquire the address of the latest recording completed area (FIG. 6 [S31] to [S33]).

Figure 6:
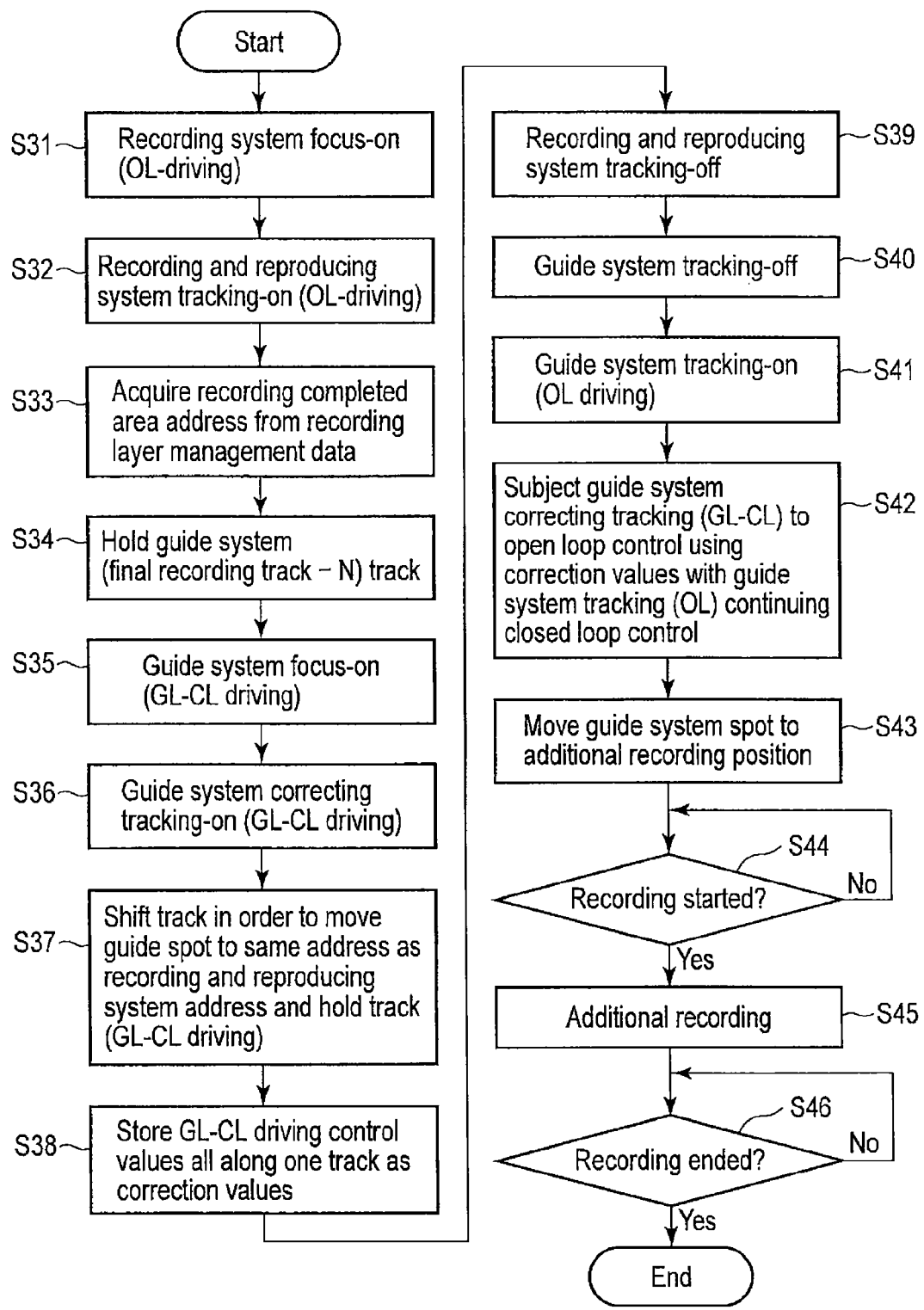
FIG. 6 is a flowchart showing an additional recording operation performed on a recording medium with recorded information according to the embodiment.

Then, the track position is shifted by a predetermined number of tracks N from the final track of the recording completed area, and the resulting track is held (FIG. 6 [S34]). This track position is the (final track number)—N.

The track shifting is to shift the focal spot to the recording completed area of the recording layer 39, as is the case with Embodiment 1.

Then, focus control is performed by driving the collimator lens (GL system) 14 in the direction of the optical axis in accordance with a focus error signal from the guide system ("guide system focus-on [GL-CL driving]"; FIG. 6 [S35]). Furthermore, tracking control is performed by driving the objective lens 5 in accordance with a tracking error signal from the guide system ("guide system tracking-on [GL-CL driving]"; FIG. 6 [S36]).

As described above, with the tracking operation performed simultaneously by the guide system and the recording and reproducing system (the former tracking operation is correcting tracking), the track address of the track being tracked by the focal spot is read from each of the guide layer 38 and the recording layer 39. The collimator lens (GL system) 14 is used to shift the track so that the same track address is read from both layers. When the same track address is read from both layers, the corresponding track is held ("shifting the track for the same address and holding the track [GL-CL driving]": FIG. 6 [S37]).

Figure 7:
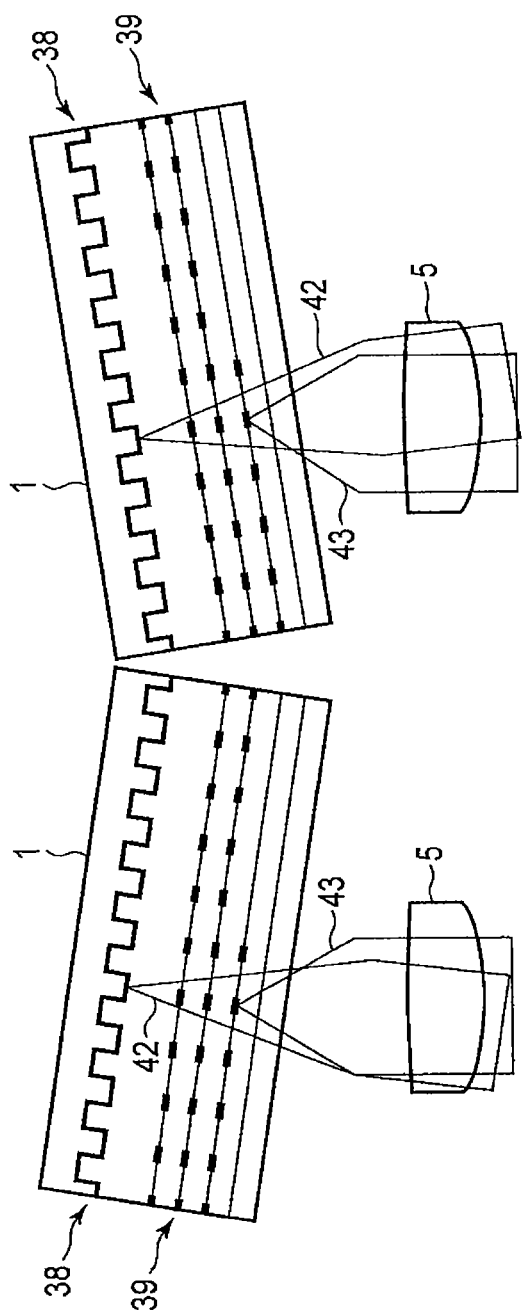
FIG. 7 is a schematic diagram showing how a tracking operation is performed according to the embodiment.

At this time, the tracking by the objective lens 5 is controlled based on signals from the WR system, and the tracking operation is performed with the GL system corrected as shown in FIG. 7. Without a change such as a tilt of the disc, the correcting tracking with the collimator lens (GL system) lens 14 should be immovable from the reference position.

However, a change such as a tilt of the disc shifts the tracking from the reference position, and thus a correcting tracking operation is performed. A control value for this correcting tracking driving is a correction value for tracking correction carried out by the guide system. The correction value is acquired all along one track at appropriate angular intervals and then held (FIG. 6 [S38]).

Thereafter, the tracking control using the objective lens 5 of the recording and reproducing system and the correcting tracking control using the collimator lens 14 of the guide system are cancelled (FIG. 6 [S39] and [S40]). Tracking control using the objective lens is performed based on signals from the guide system (FIG. 6 [S41]).

Moreover, correcting tracking by the collimator lens 14 of the guide system is started under closed loop control using the correction values acquired (FIG. 6 [S42]).

At this time, tracking by the guide system using the objective lens 5 is continued under closed loop control. Then, the track is shifted to the additional recording position based on the address from the guide system (FIG. 6 [S43]), and additional recording is carried out (FIG. 6 [S44] to [S46]).

Embodiment 2 performs control using the collimator lens 14 of the guide system as described above. Embodiment 2 thus not only exerts effects similar to the effects of Embodiment 2 described above but also facilitates adjustment of assembly of the optical system of the recording and reproducing system, enabling the manufacturing yield of OPUs to be prevented from decreasing.

Now, several modifications will be described. In Embodiments 1 and 2 described above, the collimator lens (9 or 14) that corrects the recording and reproducing system (WR system) or the guide system (GL system) is used as module for correcting the track misalignment between the recording and reproducing system (WR system) and the guide system (GL system). However, it is not limited to this configuration. Similar effects can be exerted by, for example, a configuration with a coupling lens installed between the light source and the collimator lens and a driving device that drives the coupling lens in the radial direction.

Figure 8:
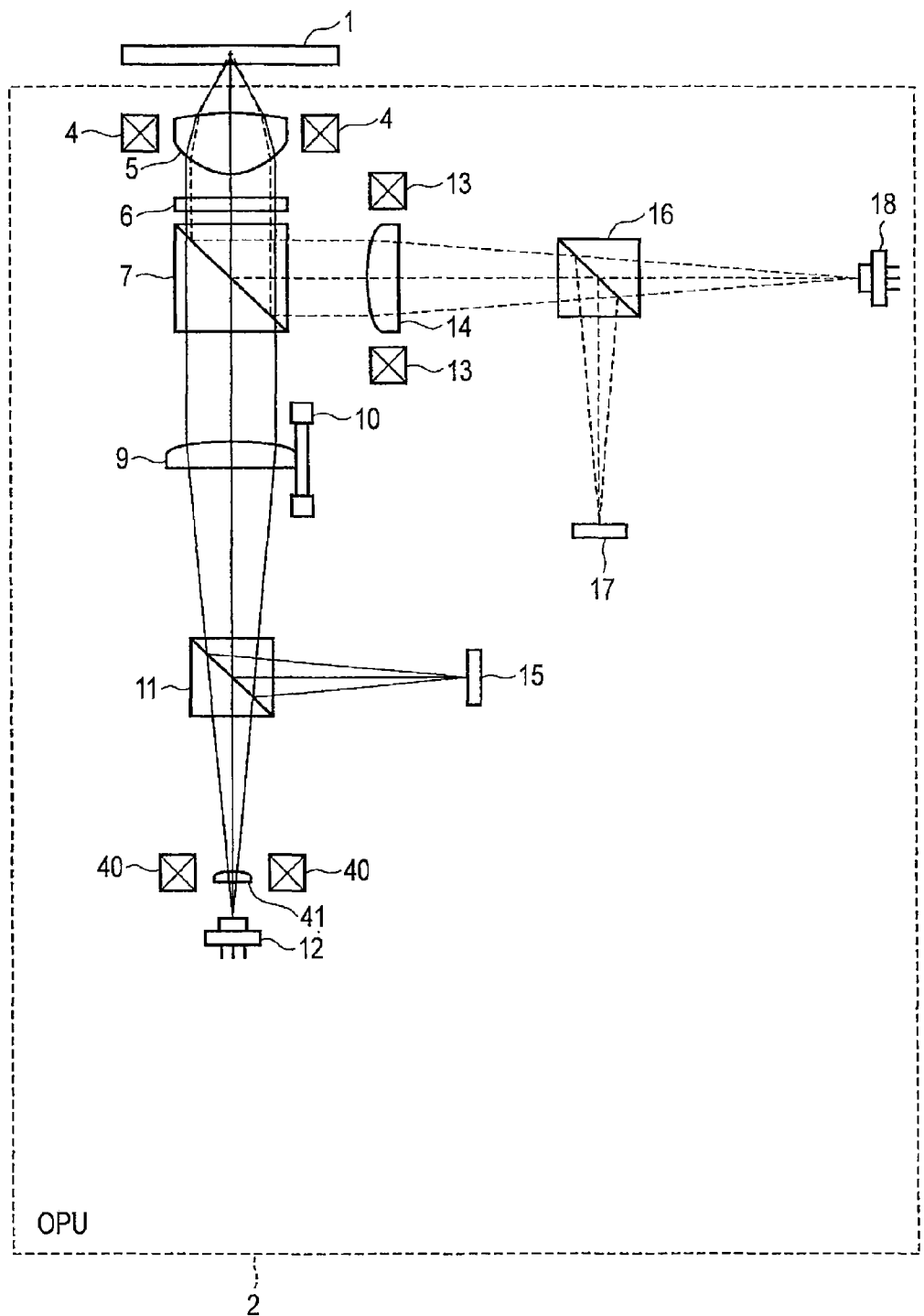
FIG. 8 is a diagram showing a modification of Embodiment 1 according to the embodiment.
Figure 9:
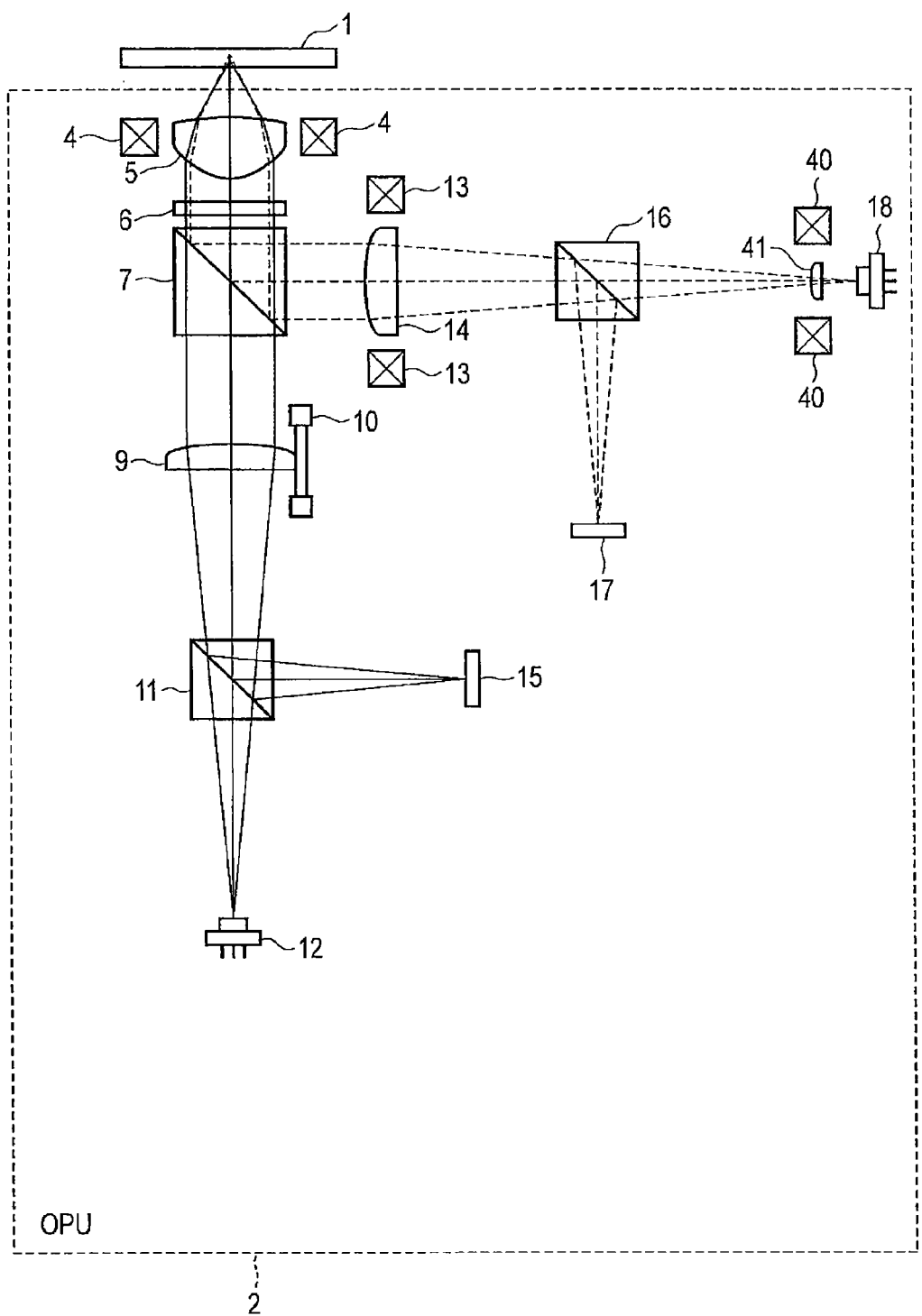
FIG. 9 is a diagram showing a modification of Embodiment 2 according to the embodiment.

FIG. 8 shows a case where the recording and reproducing system (WR system) is corrected. This is a modification of Embodiment 1. Instead of the correcting tracking control mechanism 8, a coupling lens 41 driven by the tracking control mechanism 40 is provided in the recording and reproducing system (WR system). FIG. 9 shows a case where the guide system (GL system) is corrected. This is a modification of Embodiment 2. Instead of the correcting tracking control mechanism 8, the coupling lens 41 driven by the tracking control mechanism 40 is provided in the guide system (GL system).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recording and reproducing apparatus configured to record and reproduce information in and from an optical disc comprising a guide layer with address information along a track groove and a recording layer with a sequence of recording marks in recording completed areas, the information recording and reproducing apparatus comprising:
   a guide layer focus control module configured to concentrate laser light with a first wavelength on the track groove through an objective lens and perform guide layer focus control using a focus error signal obtained from first reflected light from the track groove;
   an objective lens control module configured to perform guide layer tracking control by controlling the objective lens in accordance with a tracking error signal obtained from the first reflected light, and perform recording layer focus control by concentrating laser light with a second wavelength on the recording layer through the objective lens and control the objective lens using a focus error signal obtained from the second reflected light;
   a correction tracking control module configured to perform recording layer tracking control of the laser light with the second wavelength over the recording layer, using a tracking error signal obtained from the laser light with the second wavelength; and
   a calculation module configured to control, if the sequence of recording marks is detected, the correction tracking control module to cause the laser light with the second wavelength to be scanned over a sequence of recording marks which has the same address as that of a track groove over which the laser light with the first wavelength is scanned, and calculate an amount of relative misalignment between a track of the guide layer and a track of the recording layer, which have the same address, using a control signal which is supplied to the correction tracking control module at time of controlling the correction tracking control module, the control signal being defined based on correction values for guide layer tracking, the correction values being acquired all along one track at appropriate angular intervals,
   wherein in a case where additional recording is performed, the recording layer tracking control is performed while making correction based on the amount of the relative misalignment calculated by the calculation module, and the guide layer tracking control is performed under open loop control using the acquired correction values.

2. The information recording and reproducing apparatus of claim 1, wherein the correction tracking control module comprises:
   a collimator lens configured to act on the laser light with the second wavelength; and
   a driving mechanism configured to drive the collimator lens in a radial direction according to the amount of relative misalignment.

3. The information recording and reproducing apparatus of claim 1, wherein the correction tracking control module comprises:
   a coupling lens configured to act on the laser light with the second wavelength; and
   a driving mechanism configured to drive the coupling lens in a radial direction according to the amount of relative misalignment.

4. The information recording and reproducing apparatus of claim 1, wherein the calculation module is further configured to control tracking the guide layer tracking control of the objective lens control module.

5. The information recording and reproducing apparatus of claim 1, wherein the correction tracking control module is configured to cancel tracking control using the laser light with the second wavelength and the objective lens and correcting tracking control using the laser light with the second wavelength and a collimator lens, and perform tracking control using the laser light with the first wavelength and the objective lens.

6. An information recording and reproducing apparatus configured to record and reproduce information in and from an optical disc comprising a guide layer with address information along a track groove and a recording layer with a sequence of recording marks in recording completed areas, the information recording and reproducing apparatus characterized by comprising:
   a guide layer focus control module configured to concentrate laser light with a first wavelength on the track groove through an objective lens and perform guide layer focus control using a focus error signal obtained from first reflected light from the track groove;

an objective lens control module configured to perform recording layer focus control and recording layer tracking control by concentrating laser light with a second wavelength on the recording layer through the objective lens and control the objective lens using a focus error signal and a tracking error signal obtained from the second reflected light;

a correction tracking control module configured to perform guide layer tracking control of the laser light with the first wavelength over the guide layer, using a tracking error signal obtained from the first reflected light; and a calculation module configured to control, if the sequence of recording marks is detected, the correction tracking control module to cause the laser light with the first wavelength to be scanned over a track groove which has the same address as that of a sequence of recording marks over which the laser light with the second wavelength is scanned, and calculate an amount of relative misalignment between a track of the guide layer and a track of the recording layer, which have the same address, using a control signal which is supplied to the correction tracking control module at time of controlling the correction tracking control module, the control signal being defined based on correction values for guide layer tracking, the correction values being acquired all along one track at appropriate angular intervals, wherein in a case where additional recording is performed, the guide layer focus control is performed while making correction based on the amount of the relative misalignment calculated by the calculation module, and the guide layer tracking control is performed under open loop control using the acquired correction values.

7. The information recording and reproducing apparatus of claim 6, wherein the correction tracking control module comprises:

a collimator lens configured to act on the laser light with the first wavelength; and a driving mechanism configured to drive the collimator lens in a radial direction according to the amount of relative misalignment.

8. The information recording and reproducing apparatus of claim 6, wherein the correction tracking control module comprises:

a coupling lens configured to act on the laser light with the first wavelength; and a driving mechanism configured to drive the coupling lens in a radial direction according to the amount of relative misalignment.

9. The information recording and reproducing apparatus of claim 6, wherein the calculation module is further configured to control tracking the guide layer tracking control of the objective lens control module.

10. The information recording and reproducing apparatus of claim 6, wherein the correction tracking control module is configured to cancel tracking control using the laser light with the second wavelength and the objective lens and correcting tracking control using the laser light with the second wavelength and a collimator lens, and perform tracking control using the laser light with the first wavelength and the objective lens.

11. A method for recording and reproducing information in and from an optical disc including a guide layer with address information along a track groove and a recording layer with a sequence of recording marks in recording completed areas, the method comprising:

concentrating laser light with a first wavelength on the track groove through an objective lens and performing guide layer focus control using a focus error signal obtained from first reflected light from the track groove;

performing guide layer tracking control by controlling the objective lens in accordance with a tracking error signal obtained from the first reflected light, and performing recording layer focus control by concentrating laser light with a second wavelength on the recording layer through the objective lens and controlling the objective lens using a focus error signal obtained from the second reflected light;

perform recording layer tracking control of the laser light, via a correction tracking control module, with the second wavelength over the recording layer, using a tracking error signal obtained from the laser light with the second wavelength; and controlling, if the sequence of recording marks is detected, the correction tracking control module to cause the laser light with the second wavelength to be scanned over a sequence of recording marks, which has the same address as that of a track groove over which the laser light with the first wavelength is scanned, and calculating an amount of relative misalignment between a track of the guide layer and a track of the recording layer, which have the same address, using a control signal which is supplied to the correction tracking control module at time of controlling the correction tracking control module, the control signal being defined based on correction values for guide layer tracking, the correction values being acquired all along one track at appropriate angular intervals, wherein in a case where additional recording is performed, the recording layer tracking control is performed while making correction based on the amount of the calculated relative misalignment, and the guide layer tracking control is performed under open loop control using the acquired correction values.

12. The method of claim 11, further comprising:
controlling a collimator lens action on the laser light with the second wavelength; and
driving the collimator lens in a radial direction according to the amount of relative misalignment.

13. The method of claim 11, further comprising:
controlling a coupling lens action on the laser light with the second wavelength; and
driving the coupling lens in a radial direction according to the amount of relative misalignment.

14. The method of claim 11, further comprising:
controlling the objective lens action with the first wavelength being applied to tracking the guide layer tracking control.

15. The method of claim 11, further comprising:
cancelling tracking control using the laser light with the second wavelength and the objective lens and correcting tracking control using the laser light with the second wavelength and a collimator lens, and
performing tracking control using the laser light with the first wavelength and the objective lens.

* * * * *